United States Patent [19]

Smith

[11] Patent Number: 4,738,989

[45] Date of Patent: Apr. 19, 1988

[54] ALIPHATIC POLYURETHANE COMPOSITIONS AND METHOD OF PREPARATION

[75] Inventor: Stuart B. Smith, Conyers, Ga.

[73] Assignee: Urylon Development, Inc., Conyers, Ga.

[21] Appl. No.: 843,034

[22] Filed: Mar. 24, 1986

[51] Int. Cl.$^4$ .............................................. C08G 18/30
[52] U.S. Cl. .................................... 521/107; 521/123; 521/126; 521/127; 521/163; 521/173; 524/712; 524/783; 524/873; 524/874; 524/875; 528/55; 528/58; 528/68; 528/80; 528/81
[58] Field of Search ............... 521/107, 123, 126, 127, 521/163, 173; 524/712, 783, 873, 874, 875; 528/55, 58, 68, 80, 81

[56] References Cited

U.S. PATENT DOCUMENTS 4,080,318 3/1978 Smith et al. ........................ 528/80
4,616,043 10/1986 Smith ................................. 528/55

Primary Examiner—Maurice J. Welsh
Assistant Examiner—S. A. Acquah
Attorney, Agent, or Firm—Richard P. Crowley

[57] ABSTRACT

An aliphatic, isocyanate-base, polyurethane polymer and a process for preparing the polymer. The process comprises reacting, such as by spraying onto a substrate or an open mold, a caprolactone polyol with an aliphatic polyisocyanate in the presence of a catalytic amount of a metallo catalyst, and also in the presence of a fast-curing amount of a curing agent comprising an amine, particularly an aromatic diamine, such as diethyl toluene diamine, to provide a fast-reaction aliphatic polyurethane polymer.

28 Claims, No Drawings

ALIPHATIC POLYURETHANE COMPOSITIONS AND METHOD OF PREPARATION

BACKGROUND OF THE INVENTION

Conventional urethane-type polymers are prepared by the reaction of a polyol or a polyol-based compound with an isocyanate, typically in the presence of a metallo catalyst, and a curing agent, such as an amine. Caprolactone-type polyol polymers have been suggested for reaction with aryl isocyanates in the presence of various metallic catalysts, such as organo metallic catalysts comprising tin, lead and zinc and combinations thereof. However, when these catalysts are employed with an aliphatic isocyanate, together with a caprolactone polyol, a very slow-curing polymer results. While various combinations of the metallic catalyst may vary and the curing time, such as the combination of both lead and tin, the reaction time to prepare the aliphatic isocyanate base polymers is still quite slow, typically 2 to 24 hours or more.

In the preparation of urethane polymers, aromatic diamines, such as Detda; that is, diethyl toluene diamine, have been found to provide fast reaction between polyols with only primary OH groups less than 1250 mw and aliphatic biuret or trimerized hexamethyl diisocyanates (see, for example, U.S. Pats. Nos. 4,218,543 and 4,463,126). However, the use of such Detda catalysts provides a discoloration problem, due to the oxidation of the Detda catalysts. The Detda-type catalysts oxidize on heat and on exposure to sunlight. While the use of the Detda provides initially for a clear polymer, the continued use of the catalyst provides for a discolored; that is, a slightly brown-colored, polymer, so that the color matching of the polymer must be done with each batch, in order to provide a reproducible polymer. Typically, as the oxidation process of the Detda polymer proceeds, the amount of pigment, such as a white pigment, required, to obtain the desired color match, changes, so that the amount of pigment may increase from two to ten times from that of the original Detda-type catalyst source, in order to obtain the ultimate result in color-matching polymer. While reaction times, employing the Detda-type catalysts, can be quite fast-reacting, as low as 10 to 15 seconds, with aliphatic isocyantes, when injecting into a reaction-injection molding process; that is, a RIM process, or a spray applied in an open mold, based upon 140° F. chemical temperatures, the color discoloration and variation of such polymers, based on Detda-type catalysts, create a considerable problem. White or light-colored polymeric parts account for a significant portion of the RIM and urethane market, and, therefore, Detda-type catalysts are often not practical, such as in applications where color reproduction is important.

Therefore, there exists a need to provide for aliphatic polyurethane polymers which are fast-reacting, and which polymers may be employed within a RIM process and in spray processes and applied as various gel coats or in open-molding processes, and which polymers have high tear, tensile and green strength.

SUMMARY OF THE INVENTION

The invention relates to a process of preparing a polyurethane polymer and to the polymer so prepared, which process is fast-reacting. In particular, the invention concerns a process for preparing an aliphatic polyurethane polymer having high tensile and tear strength and high impact resistance in a fast-reacting process, which enables the polymer to be employed in RIM or spray-molding processes, and to be pigmented.

It has been discovered that fast-reacting aliphatic isocyanate-type urethane polymers may be produced by reacting a caprolactone polyol with an aliphatic polyisocyanate in the presence of a catalyst, and also in the presence of a fast spray-curing amount of a particular class of amine catalysts, in particular an aromatic polyamine, and more particularly and preferably a dialkyl toluene diamine, such as diethyl toluene diamine (Detda), to provide a fast-reacting aliphatic isocyanate caprolactone polymer, having a reaction time of about 15 seconds or less, and which polymer results in a polymer to which pigments may be added to reproducible color matching. The polymer of the invention is easily prepared by reacting, such as by mixing; for example, spraying, A- and B-side components together into a reactive spray mixture into an open or a closed mold; that is, a RIM-type process, or into an open mold onto the mold surface or onto a gel or other polymeric surface on the open mold. The A- and B-side components may be reacted, such as by spraying, to form a molded part, which subsequently may be coated or otherwise treated.

It has been discovered that the employment of a particular class of amines, such as aromatic diamines, and more particularly diethyl toluene diamines or, when employed in a curing amount, particularly in combination with certain metallo, such as organo metallic, catalysts, provides for reaction of the aliphatic polyisocyanates with a caprolactone polyol, very fast reaction times, typically less than 15 seconds, and more typically less than 5 to 10 seconds, at about 140° F. The resulting aliphatic polyurethane caprolactone polymer has high tensile and tear strengh and high impact strength. The resulting polymer, when pigmented, such as by the use of pigments, in the reaction components, provides for excellent color and light stability. It has been found that the combination of the amine curing agent, and in particular in combination with a metallic catalyst, such as a tin/lead catalyst combination, provides for a fast reaction, regardless of the type of aliphatic isocyanate employed with a caprolactone polyol, resulting in a polymer with excellent properties, particularly useful for RIM and spray-type, open-molding processes.

The process of the invention provides for preparing the polymers, by reacting substantially about a stoichiometric part of an aliphatic isocyanate which is typically slow reacting, or a slight excess of the aliphatic isocyanate, such as an excess of up to 20%, and more typically 5% to 10%, with a caprolactone polyol, typically a dipolyol or a tripolyol. The reaction is carried out in the presence of a catalytic amount of a reaction catalyst; for example, an organo metallic catalyst, such as a fatty-acid or fatty-acid alkyl organo metal catalyst, and more particularly a multivalent metal catalyst, such as tin, lead, zinc or combinations thereof, and more particularly tin and lead. Further and importantly, the process is carried out in the presence of a curing amount of an amine curing catalyst, such as, for example, Detda. Further, the employment particularly of Detda is advantageous in not only providing for a fast reaction time, but Detda does not have severe toxicity problems. The aromatic diamines may be used alone or in combination with other curing-type catalysts, such as other amine catalysts, particularly diethanol and triethanol amines. The amounts of the various amines in the combination may vary, while the amount and use of Detda is only limited by the need for color reproducibility or the use of color masking pigments.

It has been found that reacting the caprolactone polyol with aliphatic isocyanates, employing tetravalent tins or lead napthonate-type catalysts, such as with trimerized aliphatic diisocyanates or a biuret form of aliphatic isocyanates, results in a very slow-curing polymer, while combinations of both the lead and tin catalysts provide for improved curing, since the curing reaction is still slow and requires at least 2 hours. It has been found that various other amine-type catalysts, such as the triamines, pentamines, hexamines, as well as other amine polyols, are not suitable as the curing catalysts of the invention, in that such catalysts either produce a very slow cure or have toxicity problems, or both, associated with their use.

The preferred curing catalyst for use in the invention comprises an aromatic diamine, particularly alkyl-substituted toluene diamines, for example, as described in U.S. Pat. No. 4,218,543. It has been found that Detda is satisfactory and provided a rapid cure, except that, if color-reproducible results are desired, a color-masking amount of a pigment should be used. A preferred curing agent of the reaction comprises diethyl toluene diamine. The amount of the amine catalyst of the invention should be sufficient to ensure a reaction in generally less than 1 minute, but typically less than 30 seconds, and more particularly less than 15 seconds, for reaction time. Generally, the amount of the amine may vary. The amine catalysts of the invention are generally employed in the B-side component and range from about 0.5% to 10% by weight of the total range of the formulation; for example, 1% to 5%, or ranges from about 10% to 25% by weight of the B-side component.

The aliphatic isocyanates employed in the polymers of the invention are typically aliphatic diisocyanates, and more particularly are the trimerized or biuretic form of aliphatic diisocyanate, such as hexamethylene diisocyanate, or the bifunctional monomer of the tetraalkyl xylene diisocyanate, such as the tetramethyl xylene diisocyanate, which aliphatic isocyanates may be used alone or in combination.

The heterocyclic imine lactam polyols employed in the practice of the invention comprise preferably one or a combination of caprolactone polyols. The caprolactone polyester polyols employed are typically difunctional or trifunctional polyols having only primary hydroxyl groups, and having generally a hydroxyl number ranging from about 200 to 600. The caprolactone polyols provide for polymers having very high tensile strength and controlled functionality, the polyols have a low acid number in the resulting polymer and have excellent impact resistance and low smoke generation upon ignition. The caprolactone polyols, useful in the invention, are commercially available as Tone TM polyols (a trademark of Union Carbide Corporation). The caprolactone polyols particularly useful in the preparation of the polymers of the invention comprise those trifunctional and difunctional, polyols, which are generally liquid at temperatures of about 20° C. or below. While the more solid, caprolactone polyols may be employed, such polyols must be heated or solubilized, which is a disadvantage in using such polyols.

The amount of the polyol used for reacting with the prepolymer as a B-side component may vary, but typically the reaction is based on about a stoichiometric amount, or slightly less, of the polyol with the aliphatic isocyanate, or a ratio of about 2 parts of the prepolymer to 1 part of the polyol. More typically, the caprolactone polyols are employed in an amount ranging from about 5 to 50 parts, typically 35 to 50 parts, per 100 parts of the aliphatic diisocyanate. Generally, the higher the amount of the caprolactone polyol, the higher the amount of the rigidity in the resulting reactive polymer. Caprolactone polyester polyols, which are presently commercially available, have an average molecular weight ranging from about 500 to 3000 for the difunctional polyols and from about 300 to 900 for the trifunctional polyols. The polyols undergo reactions expected of a primary alcohol functionality, including reaction with isocyanates.

The reaction of the A- and B-side components in the process of the invention is carried out in the presence of a catalyst, with typically the catalyst placed in the B-side component. The trimerization catalyst employed comprises a single-stage catalyst which provides for a rapid and very high exotherm; for example, over 210° F., in less than about 10 seconds. Suitable catalysts for use in the process comprise, but are not limited to, organo metal catalysts, such as fatty-acid-alkyl esters of polyvalent metals, such as tin, zinc and lead, and more particularly, for example, a combination, such as tin and lead. The catalyst may be used alone or in combination. The amount of the catalyst used in the process may vary, such as, for example, ranging from 0.01 to 2 parts per 100 parts of the polyol; for example, ranging from about 0.05 to 0.5.

It is recognized that minor amounts of other additives may be employed in connection with the A and B components, such as, for example, but not limited to, the use of flame-retardant agents to enhance or impart desirable flame-resistant or flame-performance properties to the resulting spray polymer. Flame-retardant agents which may be employed include, but are not limited to, hydrated silicas and alumina, as well as organic-type flame-retardant agents, such as, for example, phosphates, halogenated compounds and more typically halogenated phosphate esters, such as, for example, polychloro phosphate esters, generally added to the B-side component, to reduce the viscosity and also to reduce flame spread of the polymer. In addition, moisture-scavenging agents may be incorporated, in order to reduce or prevent foaming. For example, it has been found that the employment of molecular sieves or other moisture-scavenging agents may be employed, to eliminate foam tendency. In one embodiment, it has been found that dehydrated molecular-sieve particles, with an alkali cation suspended in a liquid suspending agent, such as a glycerine, may be added to the B-side component, to eliminate any tendency to foam. Also, acid scavengers may be added to reduce the tendency of flame retardants, particularly halogenated agents, to cause hydrolysis and the formation of acids. Suitable acid scavengers have been found to be epoxy resins which react with the acid formed.

In the event that a foam polymer is desired, a blowing agent may be employed, such as water, and more typically the use of a halocarbon, and more typically a chlorofluoro alkane, such as Freon 11, a trichlorofluoro methane, a Freon 113, a trichloro trifluoro ethane, may be employed, with the Freon 113 preferred for a spraying operation, since the hose temperature can run higher without premature blowing in the hose of the spraying equipment. Generally, where blowing agents are employed, it is desirable to employ a cell-control agent, and a typical cell-control agent would comprise a silicone or a hydroxy silicone material as an antifoamer degassing agent and cell-control agent.

Where a polymer of increased flexual modulus and reduced shrinkage is desired, strengthening-type agents may be incorporated, either in the A- or B-side component, or introduced into the reaction mixture or into the spray pattern, to provide such enhanced flexual modulus, such as a fibrous or particulate-type material. Materials, which can be employed, include a wide variety of fibers, and more particularly glass fibers, such as chopped or woven glass fibers. The glass fibers may be chopped into short fibers by a chopper above or adjacent the exit nozzle of the spray equipment, so that the chopped glass falls onto the reaction mixture exiting from the nozzle tip of the spraying equipment. In addition, particular materials may be employed, as well as other additive materials, such as pigment dyes, carbon particles, carbon fibers, synthetic fibers, and various other additives.

The reaction mixture of the process may be sprayed or poured, to produce a foam or solid coating on a variety of substrates, since the reaction adheres well to a variety of substrates, or can be made to release from substrates by the use of mild release agents. Generally, the process is carried out by spraying together the A- and B-side components into a closed mold, such as in a RIM-type process, or more particularly onto an open mold surface, and more generally onto a gel coat mold, such as a polyester gel coat or acrylic molds. It has been found that the process may be carried out by spraying the A- and B-side components onto a gel coat made, for example, of a neopentyl glycol resin or onto a vacuum-formed acrylic part, or onto a polyester resin substrate containing chopped fiberglass, or onto other polymer gel-type precoats in an open-molding process, with excellent release.

Thus, the process of the invention and the resulting polymer are usefully employed in spraying open-mold techniques onto glass fiber or polymeric substrates, with good adhesion and stiffness. The caprolactone aliphatic isocyanate urethane polymers of the invention, with the lead/tin catalyst and triethanol amine curing agent, result in a fast-curing polymer, with the finished polymer clear in color and, when pigmented, shows excellent color and light stability. The resulting polymer may be foamed to low densities of 20 pcf to 65 pcf, still exhibiting excellent properties. The process of the invention provides a substantially full cure time in less than 5 minutes, and typically about 1 to 2 minutes, and also provides for rapid demolding of the part from the mold. The process provides for open or closed-mold parts which are rigid, but not excessively brittle, and which have high mold green strength.

The polymers may be produced in various colors, such as white or light or other colors, even dark pigments, by the use of pigments incorporated in the components. Generally, where a light or white-colored polymer is desired, a pigment is incorporated in the B-side component, such as a metallic salt, such as a metallic oxide; for example, one pigment would comprise titanium dioxide. The pigments are used in an amount alone or in combination, to obtain a desired color, but generally range from up to 30 parts per 100 parts of the B-side component, such as 1 to 15 parts, such as 2 to 10 parts.

The amount of the blowing agent to be employed may vary, and generally may range from 0 parts, when no blowing is desired, to about 15 parts by weight per 100 parts of the isocyanate. While the amount of the silicon surfactant may vary, the silicone generally ranges from about 0 to 2 parts by weight per 100 parts of the isocyanate, such as, for example, from about 0.1 to 0.7 parts by weight. Where moisture-scavenging or acid-scavenging agents are employed, such as in the preparation of solid spray coatings, the amount of the agent may vary, depending on the amount of the moisture or acid; however, amounts ranging from about 0.5 to 15 parts; for example, from 5 to 10 parts, per 100 parts of isocyanate, may be employed. Further, where strengthening particles of fibers, such as glass fibers, are introduced into the reactive spray, amounts ranging from up to about 30% by weight of glass fibers, and more typically from about 10 to 25 parts per weight, of the isocyanate may be employed as glass fibers. Surfactants, such as nonionic surfactants, may be employed, to aid in dispersion of the components generally in the B side at 0.1 to 5 parts; for example, 0.5 to 4 parts, per 100 parts of the B side.

The invention will be described for the purpose of illustration only in connection with certain embodiments; however, it is recognized that various changes, modifications, additions and improvements may be made by those persons skilled in the art, all falling within the spirit and scope of the invention.

DESCRIPTION OF THE EMBODIMENTS

EXAMPLE 1

A- and B-side component compositions were prepared as follows: A side 134 parts by weight (pbw) of a trimerized aliphatic isocyanate (22% free NCO) N-3300 from Mobay Chemical Co.

B side 50 pbw caprolactone trifunctional polyol, average molecular weight 300, hydroxyl No. 560, viscosity 225 at 25° C. (Tone 0301 of Union Carbide Corporation)

0.2 pbw nonionic surfactant (IGEPAL 630 from GAF Corporation)

5.8 pbw diethyl toluene diamine (Detda)

0.1 pbw dibutyl tin dilaurylate 0.1 pbw lead naphthenate 20.0 pbw titanium dioxide pigment The two components A and B were then pumped through a high pressure Rim machine at 1000 psi and at 140° F. into a mold $\frac{1}{8}\times 12''\times 12''$. The molded material was demolded in 120 seconds. The molded part had excellent green strength. Upon cooling, the part was white in color, with good tensile, tear and impact strength. No mold-release agent was required.

EXAMPLE 2

Example 1 was repeated, using as the A-side component a biuret aliphatic isocyanate (Mobay Chemical Co.). The results showed no difference between the two examples with regards to physical properties; however, reaction times were slightly faster using the N-100 biuret isocyanate, but heat resistance was less with the biuret.

EXAMPLE 3

Both Examples 1 and 2 were sprayed through a high-pressure spray mixer at 140° F. onto a polyester gel-coated open mold using high-pressure equipment and an internal mixing spray gun. Gel times were 3 seconds, for Example 2 formulation, and 6 seconds, for Example 1 formulation. The mold temperature was 75° F. The same physical properties were obtained spraying as in Examples 1 and 2.

EXAMPLE 4

Example 1 is repeated, using tetramethylene xylene diisocyanate (TMXI of American Cyanamid) as the A-side aliphatic isocyanate. This material is a bifunctional monomer, not a prepolymer, with the % NCO 31.8.

EXAMPLE 5

Polycaprolactone Tone 0305 trifunctional polyol was substituted in the B side (average molecular weight 540, hydroxyl No. 330) for Tone 0301, adjusting for the reduction in hydroxyl number. The results were the same, except the molded parts were more flexible.

EXAMPLE 6

Example 1 was repeated, substituting an amine polyol (Texaco T-5000 and T-400) as the curing agent. The components on mixing gelled instantly; however, the mixture was very slow to cure and did not cure in 12 hours.

EXAMPLE 7

Example 1 is repeated, employing about 10 parts of trichloro phosphate ester as a flame-retardant agent to the B-side composition, to provide a flame-retardant aliphatic polymer.

EXAMPLE 8

A foam-sprayed aliphatic polymer is prepared by employing about 10 parts of Freon 113 to the B side as a foaming agent, together with 1 part of a silicone cell-control agent; for example, a glycol silicone copolymer, to provide, on spraying the A- and B-side components, a foam-sprayed coating on a substrate.

EXAMPLE 9

Example 1 was repeated employing a difunctional caprolactone polyol, average molecular weight 560, hydroxyl number 210 (Tone TM 201), a liquid at room temperature, with the amount used stoichiometrically adjusted. The reaction time was 6 seconds, and the resulting reactive polymer exhibited excellent strength. Increased ratio of the amine curing catalyst to the caprolactone polyol increased the polymer stiffness and reaction rate.

The foregoing examples demonstrate that the diamine as a curing agent, in combination with a metallo catalyst system, particularly a tin/lead catalyst with caprolactone polyols and a variety of aliphatic polyisocyanates, provides a fast-curing aliphatic polyurethane polymer suitable for Rim or spray-molding processes.

What is claimed is:

1. A process of preparing a fast-curing urethane polymer, which process comprises reacting about 100 parts by weight of an aliphatic polyisocyanate with from about 5 to 50 parts by weight of a caprolactone polyol in the presence of a catalytic amount of a metallo catalyst and in the presence of a curing amount of an alkyl-substituted aromatic diamine, to provide for a reaction time of about 60 seconds or less.

2. The process of claim 1 wherein the aliphatic isocyanate comprises an aliphatic monomeric diisocyanate.

3. The process of claim 2 wherein the aliphatic isocyanate comprises a tetramethylene xylene diisocyanate.

4. The process of claim 1 wherein the aliphatic isocyanate comprises a trimerized or biuret form of hexamethylene diisocyanate.

5. The process of claim 1 wherein the caprolactone polyol has a hydroxyl number ranging from about 200 to 600.

6. The process of claim 1 wherein the caprolactone polyol is a trifunctional or difunctional liquid polyol.

7. The process of claim 1 wherein the metallic catalyst comprises an organo metallic salt selected from the group consisting of lead, tin and zinc and combinations thereof.

8. The process of claim 1 wherein the catalyst comprises a combination of an organo metallic salt of lead and tin.

9. The process of claim 1 wherein the aromatic diamine is diethyl toluene diamine.

10. The process of claim 1 wherein the aromatic diamine is present in a curing amount, to provide for a reaction time of less than about 15 seconds.

11. The process of claim 1 which includes carrying out the reaction in the presence of a color-producing amount of a pigment.

12. The process of claim 11 wherein the pigment comprises from about 1 to 30 parts by weight of titanium dioxide per 100 parts of the reaction mixture.

13. The process of claim 1 which includes carrying out the reaction in the presence of a blowing amount of a blowing agent, to provide a foam aliphatic urethane polymer.

14. The process of claim 1 which includes carrying out the reaction in the presence of a flame-retardant amount of a flame-retardant agent.

15. The process of claim 14 which includes carrying out the reaction in the presence of a halogenated phosphate or a halogenated phosphate flame-retardant agent.

16. The process of claim 1 wherein the aromatic diamine is present in an amount of from about 0.5% to 10% by weight of the composition.

17. The process of claim 1 wherein the caprolactone polyol is employed in an amount of about 5 to 50 parts per 100 parts of the aliphatic isocyanate, wherein the aliphatic isocyanate comprises a diisocyanate.

18. The process of claim 1 which includes preparing the A-side composition containing the aliphatic isocyanate and a B-side composition containing the caprolactone polyol, the catalyst and the curing agent, and spraying the A- and B-side compositions into a mold or onto a substrate in an open mold.

19. The process of claim 18 which includes spraying the A- and B-side compositions as a layer onto a substrate, wherein the substrate comprises a polyester resin gel coat layer in an open mold.

20. The aliphatic urethane polymer prepared by the process of claim 1.

21. The sprayed urethane coated substrate prepared by the process of claim 18.

22. The sprayed aliphatic urethane coated polymer substrate prepared by the process of claim 19.

23. A process for preparing a fast-reacting aliphatic urethane polymer suitable for use in a molding operation, and which process comprises preparing A- and B-side compositions and spraying together the A- and B-side compositions onto a substrate, wherein the A-side composition comprises 100 parts by weight of an aliphatic trimerized or biuret diisocyanate or a monomeric aliphatic diisocyanate, and the B-side composition comprises from about 5 to 50 parts by weight of a liquid trifunctional or difunctional caprolactone polyol having a hydroxyl number ranging from about 200 to 600, and a catalytic amount of a tin and organo metallic catalyst, and a curing amount of a diethyl toluene diamine, the A- and B-side components reacting in about 15 seconds or less.

24. The process of claim 23 which includes, in the B-side component, a color-producing amount of a metallic pigment, to provide a pigmented polymer of the desired color.

25. the aliphatic urethane polymer produced by the spraying process of claim 23.

26. The process of claim 23 which includes spraying the reactive mixture onto an open mold or a resin gel coat substrate in an open mold.

27. The sprayed aliphatic urethane coated polymer substrate prepared by the process of claim 23.

28. The process of claim 18 wherein the aromatic diamine comprises diethyl toluene diamine which is present in an amount ranging from about 10% to 25% by weight of the B side composition.

* * * * *